United States Patent [19]

Takahashi et al.

[11] Patent Number: 5,591,481
[45] Date of Patent: Jan. 7, 1997

[54] METHOD OF MANUFACTURING A MAGNETIC RECORDING MEDIUM INCLUDING FORMING A GRAFT POLYMER LUBRICANT LAYER BY IRRADIATING MONOMERS WITH RADICALS OR ATOMIC GAS

[75] Inventors: Kiyoshi Takahashi; Mikio Murai, both of Osaka; Masaru Odagiri, Hyogo; Hideyuki Ueda, Osaka, all of Japan

[73] Assignee: Matsushita Electric Industrial Co., Ltd., Osaka, Japan

[21] Appl. No.: 534,406

[22] Filed: Sep. 27, 1995

Related U.S. Application Data

[62] Division of Ser. No. 224,994, Apr. 8, 1994, abandoned, which is a continuation of Ser. No. 913,357, Jul. 15, 1992, abandoned.

[30] Foreign Application Priority Data

Jul. 15, 1991 [JP] Japan ..................................... 3-173614

[51] Int. Cl.[6] ................................................ G11B 5/72
[52] U.S. Cl. .......................... 427/131; 427/487; 427/490; 427/502; 427/130
[58] Field of Search .................................. 427/130, 487, 427/490, 502, 131; 428/694 TP

[56] References Cited

U.S. PATENT DOCUMENTS

| | | | |
|---|---|---|---|
| 4,368,239 | 1/1983 | Nakajima et al. | 428/421 |
| 4,404,247 | 9/1983 | Dominguez-Burguette | 428/213 |
| 4,419,404 | 12/1983 | Arai et al. | 428/336 |
| 4,526,833 | 7/1985 | Burguette | 428/336 |
| 4,636,435 | 1/1987 | Yanagihara et al. | 428/336 |
| 4,880,687 | 11/1989 | Yokoyama et al. | 428/141 |
| 4,960,609 | 10/1990 | Homola et al. | 427/38 |
| 5,030,478 | 7/1991 | Lin et al. | 427/54.1 |
| 5,049,410 | 9/1991 | Johary et al. | 427/131 |
| 5,118,577 | 6/1992 | Brar et al. | 428/409 |
| 5,143,787 | 9/1992 | Frew et al. | 428/408 |
| 5,182,132 | 1/1993 | Murai et al. | 427/577 |
| 5,227,211 | 7/1993 | Eltoukmy et al. | 428/64 |

FOREIGN PATENT DOCUMENTS

| | | |
|---|---|---|
| 60-035330 | 2/1985 | Japan . |
| 63-222314 | 9/1988 | Japan . |
| 2-125456 | 5/1990 | Japan . |
| 2-158909 | 6/1990 | Japan . |
| 2-158690 | 6/1990 | Japan . |
| 02198001 | 8/1990 | Japan . |
| 3-113825 | 5/1991 | Japan . |
| 2057298 | 4/1981 | United Kingdom . |

*Primary Examiner*—Stevan A. Resan
*Attorney, Agent, or Firm*—McDermott, Will & Emery

[57] ABSTRACT

A protection film and a lubricant layer of monomers are formed successively on a ferromagnetic metal thin film formed on a nonmagnetic substrate or on a base of sliding member. Then, the lubricant layer is irradiated with radicals or atomic gas in the plasma discharge or with an electron beam to form graft polymers in the lubricant layer, and the protection film and the lubricant layer are bonded chemically. Thus, the reliability of a magnetic recording medium and a sliding member can be improved.

3 Claims, 7 Drawing Sheets

METHOD OF MANUFACTURING A MAGNETIC RECORDING MEDIUM INCLUDING FORMING A GRAFT POLYMER LUBRICANT LAYER BY IRRADIATING MONOMERS WITH RADICALS OR ATOMIC GAS

This is a divisional of application Ser. No. 08/224,994, filed Apr. 8, 1994, abandoned, which was a continuation under 37 C.F.R. § 1.62 of application Ser. No. 07/913,357, filed Jul. 15, 1992, abandoned.

BACKGROUND OF THE INVENTION

1. Field of the Invention

The present invention relates to a magnetic recording medium of ferromagnetic metal and a sliding member such as a magnetic head having a protection film and a manufacturing method thereof.

2. Description of the Prior Art

A magnetic recording medium of ferromagnetic metal is formed by forming Co, Ni or Fe or an alloy including Co, Ni or Fe as a main component with use of vacuum deposition, sputtering, ion plating or the like, on a substrate of polymer film of polyester, polyimide or the like or of nonmagnetic metal. Such a type of magnetic recording medium can increase the recording density precipitously compared with a magnetic recording medium of coating type.

In order to increase the recording density of the magnetic recording medium of ferromagnetic metal, it is important to decrease the defects in the magnetic layer for recording and reproduction as small as possible and to decrease the spacing loss between the magnetic head and the magnetic recording medium as small as possible. Further, it is also necessary for a magnetic recording medium of ferromagnetic metal to have an endurance property.

In order to satisfy these conditions, a protection film and a lubricant layer are known to be provided on the magnetic layer of the magnetic recording medium after the magnetic layer is formed (for example Japanese Patent laid open Publication 2-158909/1990). Further, an oxide layer and a lubricant layer are formed after the formation of the magnetic layer (Japanese Patent laid open Publication 3-113825/1991), and a magnetic disk is subjected to the plasma processing with inert gas such as nitrogen after a lubricant layer of fluoroether is formed on a protection film of carbon (U.S. Pat. No. 4,960,609).

However, in the above-mentioned magnetic recording medium wherein a lubricant layer is formed on a protection film, the bond between the protection film and the lubricant is insufficient. Then, when the magnetic recording medium is used practically in a video cassette recorder, the lubricant layer is scratched by the head and the head clogging occurs eventually. On the other hand, in the above-mentioned method of providing an oxidation layer on a protection film and a lubricant layer on a protection film and in the above-mentioned method of plasma processing with inert gas after a lubricant layer is formed on a protection film, defects such as pin holes are generated in the protection film itself due to ion damages or the like, and this deteriorates the corrosion resistance.

A sliding member such as a magnetic head, a fixing guide to guide a tape in a video cassette recorder or a drum for recording and reproduction is required to maintain the abrasion resistance and the low friction characteristic for a long time. As to a magnetic head, especially a metal-in-gap head, a head of layered type and a head of thin film type which expose a different kind of material on the sliding plane of recording medium, the sliding with a different material occurs at the sliding plane, so that a material of lower hardness is abrased and the spacing with the medium increases near the gap of the head. Then, the magnetization of the medium becomes insufficient on recording and the magnetization signal of the medium is not read sufficiently on reproduction. Thus, the output decreases largely.

In order to satisfy these properties, a diamond-like carbon film or a hard carbon film is used as a protection film on a metallic base (for example, a drum for magnetic recording and reproduction disclosed in Japanese Patent laid open Publication 2-125456/1980, and a sliding member disclosed in Japanese Patent laid open Publication 2-158690/1990).

However, in such a sliding member, though the abrasion resistance for a short time can be improved, not only a component sliding counter to the sliding member is abrased, but also the friction coefficient increases and the component itself is abrased rapidly after a certain time passes so that the function as a sliding member is lost.

SUMMARY OF THE INVENTION

An object of the present invention is to provide a magnetic recording medium wherein the bond between a protection film and a lubricant layer is strengthened and the head clogging and the corrosion resistance are improved largely as the practical performance in a video cassette recorder and a manufacturing method thereof.

Another object of the present invention is to provide a sliding member which can maintain the abrasion resistance and the low friction characteristic for a long time.

A magnetic recording medium according to the present invention comprises: a thin film of ferromagnetic metal, which film being formed on a nonmagnetic substrate; a protection film formed on the ferromagnetic metal thin film; and a lubricant layer formed on the protection film, which lubricant layer consisting of a mixture of monomers including long-chain alkyl groups and graft polymers including the long-chain alkyl groups and having the protection film as trunks. A manufacturing method of magnetic recording medium according to the present invention comprises the steps of: forming a ferromagnetic metal thin film on a nonmagnetic substrate; forming a protection film on the ferromagnetic metallic thin film; forming a lubricant layer on the protection film, the lubricant layer consisting of monomers; and forming graft polymers by irradiating the lubricant layer with radicals or atomic gas.

Thus, in a magnetic recording medium consisting of a ferromagnetic metal thin film, a protection film and a lubricant layer formed successively, or in a sliding member having a protection film and a lubricant layer formed successively on a base, a part of the monomers of the lubricant layer includes graft monomers having the protection film as trunks formed with use of radicals, atomic gas or electron beam. Then, graft monomers can be formed without changing the strength of the protection film or without the above-mentioned damages to the protection film due to ions. Therefore, reactive groups separated from the monomers partly form chemical bonds with the protection film, and the lubricants adhere to the protection film firmly. Further, the graft polymers protect the monomers eventually, so that a constant amount of lubricants always exist on the protection film. Therefore, the head clogging and the corrosion resistance are improved largely as to the practical performance when the magnetic recording medium is used in a video cassette recorder.

An advantage of the present invention is that the head clogging due to magnetic recording medium is reduced in a video cassette recorder.

Another advantage of the present invention is that a sliding member can maintain the abrasion resistance and the low friction characteristic for a long time.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
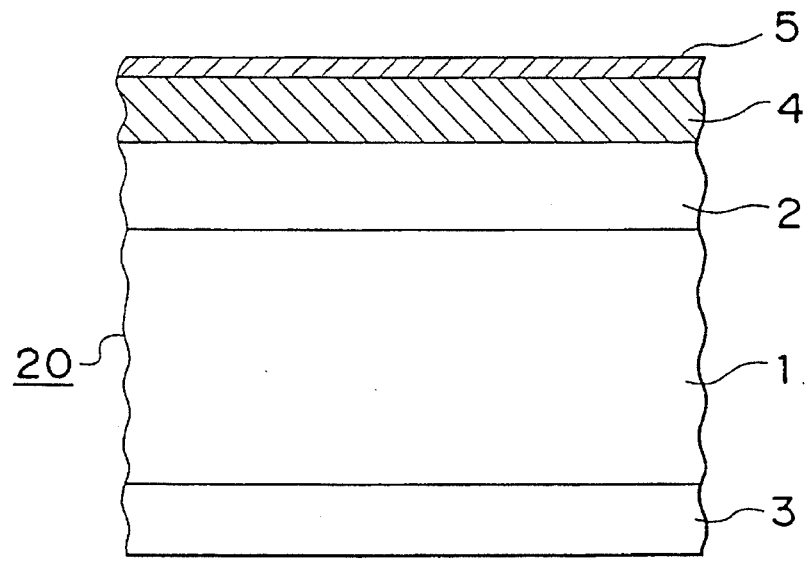
FIG. 1 is a sectional view of a magnetic recording medium.

Referring now to the drawings, wherein like reference characters designate like or corresponding parts throughout the several views, an embodiment of the present invention will be explained below with reference to drawings.

EMBODIMENT 1

FIG. 1 shows the basic structure of a magnetic recording medium 20 of an embodiment of the present invention. In FIG. 1, a nonmagnetic substrate 1 is made of a polyester (PET) film of 3–20 μm thickness. A thin film 2 of ferromagnetic metal of Co-Ni alloy of 0.1–0.2 μm thickness is formed on the surface of the nonmagnetic substrate 1 with oblique deposition. A back coating layer 3 made of a mixture of resin, carbon or the like is formed on the rear surface of the nonmagnetic substrate 2 in order to improve the running property. A protection film 4 is formed on the ferromagnetic metal thin film 2. The protection film 4 is for example an amorphous carbon film deposited by a plasma CVD technique with use of a mixture of argon and hydrocarbon atoms. Further, a lubricant layer 5 consisting of a mixture of monomers including long-chain alkyl groups and graft polymers including the long-chain alkyl groups and having the protection film as trunks is formed on the protection film 4.

The specifications of the magnetic recording medium 20 manufactured in the methods of Embodiments 1–5 are as follows: A thin film 2 of ferromagnetic metal having Co as a main component of about 1800 Å thickness is formed. Then, a diamond-like carbon film of Vickers hardness about 2300 kg/cm$^2$ of thickness of about 100 Å is formed as a protection film 4 on the thin film 2. Then, a lubricant layer 5 of various monomers is formed on the protection film 4, and then the lubricant layer 5 is processed to be mixed with graft monomers having the protection film 4 as trunks.

Figure 2:
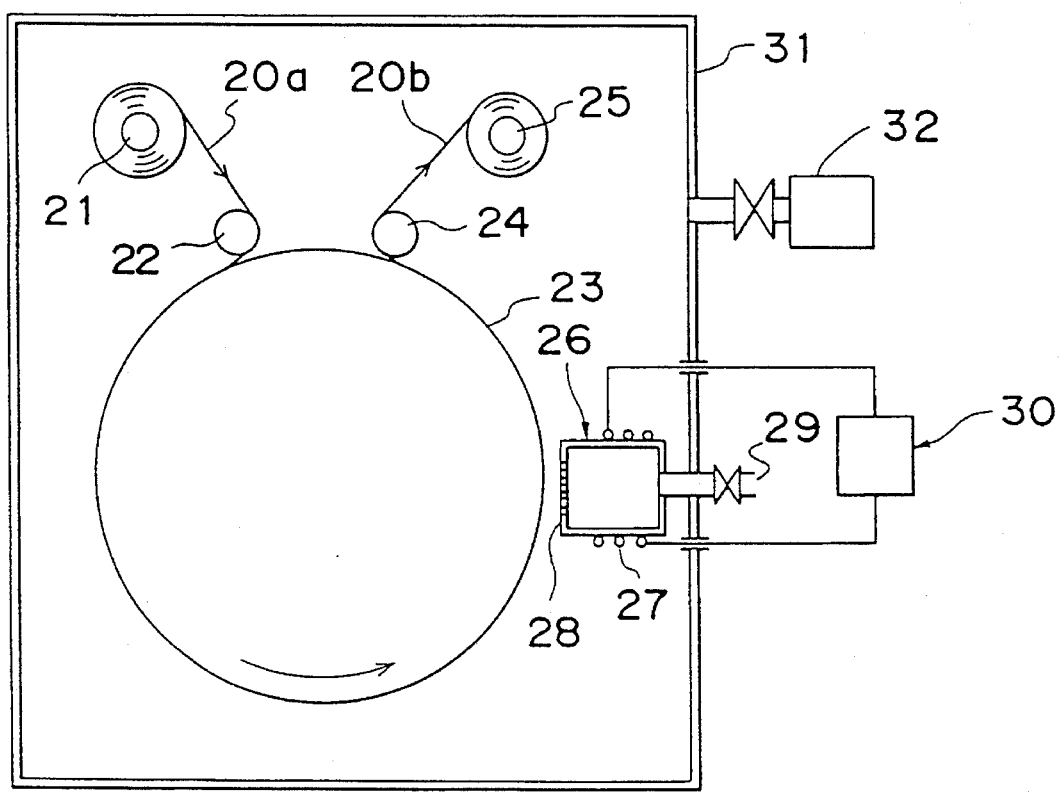
FIG. 2 is a schematic diagram of an apparatus for a manufacturing method wherein graft polymers are formed by using radicals or atomic gas in plasma discharge.

FIG. 2 shows a structure of an apparatus for a manufacturing method wherein radicals or atomic gas generated in plasma discharge are used in order to prepare graft polymers having the protection film 4 as trunks from a part of the monomers of the lubricant layer 5.

In FIG. 2, the reference numeral 20a denotes a magnetic recording medium which has a lubricant layer 5 made of monomers. The magnetic recording medium is wound on a feed roller 21 and it is fed under the control of tension. The reference numerals 22 and 24 denote path rollers which make contact with the magnetic recording medium 20 to be rotated. The reference numeral 23 denotes a main roller. The surface temperature of the main roller 23 is controlled, while the rotation of the main roller 23 is controlled to carry the magnetic recording medium at a constant speed. The reference numeral 25 is a winding roller which winds continuously the magnetic recording medium 20b which has the lubricant layer 5 including graft polymers. It is also controlled as to the tension as the feed roller 21. Thus, the magnetic recording medium 20 runs from the feed roller 21 to the winding roller 25 in a vacuum chamber 31.

On the other hand, the reference numeral 26 denotes a discharge tube, while the reference numeral 27 denotes an excitation coil for discharge which generates plasma in the discharge tube 26 by applying a voltage from a power supply 30. The reference numeral 28 denotes a slit for taking out radicals or atomic gas in the plasma generated in the discharge tube 26. Further, the reference numeral 29 denotes a gas inlet which supplies material gas for producing the radicals or the atomic gas. A source of the radicals or the atomic gas is composed of the discharge tube 26, the excitation coil 27, the slits 28, the gas inlet 29 and the power supply 30. The material gas can be introduced at a partial pressure of 0.5–0.0005 Torr through the gas inlet 29. The power supply 30 can generate a voltage up to 10 kV at a frequency of 10 KHz–5 GHz. The radicals or atomic gas supplied through the slits 28 irradiate the magnetic recording medium 20a having a lubricant layer 5 made of monomers, and after the plasma processing, the lubricant layer 5 includes graft polymers having the protection film as trunks.

A magnetic recording medium is manufactured with use of the apparatus as constructed above as will be explained below with reference to FIG. 2. First, the vacuum chamber 31 is evacuated with a vacuum pump 32. After the prescribed vacuum (5×10$^{-4}$ or less) is attained, the surface temperature of the main roller 23 is controlled to be constant. The magnetic recording medium 20a having a lubricant layer 5 made of monomers contacts closely with the main roller 23, and it is fed continuously from the feed roller 21 to the winding roller 25. On the other hand, the device for generating radicals or atomic gas generates plasma in the discharge tube 26 under the supply of an electric voltage from the power supply 30 and of material gas through the gas inlet 29.

Because the pressure of the material gas is as high as 0.1 Torr, the ions in the plasma generated in the discharge tube 26 have the ion ratio of 7% or less and the ions are cut off further by the slits 28 to reduce the ion ratio to a few or less. Thus, almost only radicals or atomic gas reach to the magnetic recording medium 20. Under the action of the radicals or atomic gas, a part of the protection film 4 combines with a part of the constituent elements of the monomers of the lubricant layer 5 to form graft polymers having the protection film as trunks. Therefore, a strong bond between the protection film 4 and the lubricant layer 5 can be formed. Further, the head clogging, the corrosion resistance and the still frame life which are important as the practical performance when the magnetic recording medium is used in a video cassette recorder are improved largely.

while the supply power per unit area of the magnetic recording medium 20 is changed for each sample. The ratio of graft polymers to the whole lubricant layer 5 can be changed by controlling the time to irradiate the lubricant layer made of monomers with radicals or atomic gas. In concrete, each sample is manufactured by changing the feed speed of the magnetic recording medium 20.

Next, as to the kind of the material gas, nitrogen is used mainly, and other material gases are used in the conditions where the best results are obtained with use of nitrogen gas. Further, the ratio of ions to the radicals or the atomic gas is changed by the width and the thickness of the slits 28. The ratio is 7% or less except samples Nos. 25 and 26, as shown in Table 1. The ion ratio is measured with a plasma spectroscopic analyzer MCPD-1000 of Ohtsuka Denshi Co. Ltd.

In the method of the present embodiment and other embodiments to be explained later wherein radicals or atomic gas are radiated on the protection film, the plasma is generated in low vacuum ($10^{-1}$–$10^{-2}$ Torr) and most charged

TABLE 1

| Sample No. | Number of C in monomer | Number of F in monomer | Number of C in graft polymer | Supply power (W/cm$^2$) | Ratio of graft polymers (%) | Irradiation time of radicals (sec) | Material gas for radicals | Gas flow rate (cc/min) | Ion ratio (%) |
|---|---|---|---|---|---|---|---|---|---|
| 1 | 8 | 4 | 16 | 2 | 50 | 5 | N$_2$ | 30 | <7 |
| 2 | 10 | 5 | 20 | 2.5 | 50 | 4 | N$_2$ | 30 | <7 |
| 3 | 20 | 1 | 60 | 5 | 50 | 3 | N$_2$ | 30 | <7 |
| 4 | 20 | 2 | 60 | 5 | 50 | 3 | N$_2$ | 30 | <7 |
| 5 | 20 | 5 | 60 | 5 | 50 | 3 | N$_2$ | 30 | <7 |
| 6 | 20 | 10 | 20 | 3 | 50 | 4 | N$_2$ | 30 | <7 |
| 7 | 20 | 10 | 60 | 5 | 5 | 0.5 | N$_2$ | 30 | <7 |
| 8 | 20 | 10 | 60 | 5 | 10 | 1 | N$_2$ | 30 | <7 |
| 9 | 20 | 10 | 60 | 5 | 30 | 2.5 | N$_2$ | 30 | <7 |
| 10 | 20 | 10 | 60 | 5 | 50 | 3 | N$_2$ | 30 | <7 |
| 11 | 20 | 10 | 60 | 5 | 80 | 5 | N$_2$ | 30 | <7 |
| 12 | 20 | 10 | 60 | 5 | 90 | 8 | N$_2$ | 30 | <7 |
| 13 | 20 | 10 | 60 | 5 | 95 | 10 | N$_2$ | 30 | <7 |
| 14 | 20 | 10 | 200 | 10 | 50 | 2.5 | N$_2$ | 30 | <7 |
| 15 | 20 | 10 | 500 | 15 | 50 | 2 | N$_2$ | 30 | <7 |
| 16 | 20 | 20 | 60 | 8 | 50 | 3 | N$_2$ | 30 | <7 |
| 17 | 20 | 20 | 200 | 15 | 50 | 2 | N$_2$ | 30 | <7 |
| 18 | 20 | 25 | 60 | 5 | 50 | 3 | N$_2$ | 30 | <7 |
| 19 | 50 | 10 | 50 | 10 | 50 | 3 | N$_2$ | 30 | <7 |
| 20 | 50 | 20 | 50 | 12 | 50 | 3 | N$_2$ | 30 | <7 |
| 21 | 50 | 20 | 200 | 15 | 50 | 2 | N$_2$ | 30 | <7 |
| 22 | 50 | 20 | 500 | 20 | 50 | 1.5 | N$_2$ | 30 | <7 |
| 23 | 50 | 50 | 200 | 18 | 50 | 2 | N$_2$ | 30 | <7 |
| 24 | 100 | 20 | 200 | 20 | 50 | 1 | N$_2$ | 30 | <7 |
| 25 | 20 | 10 | 60 | 5 | 50 | 3 | N$_2$ | 30 | 10 |
| 26 | 20 | 10 | 60 | 5 | 50 | 3 | N$_2$ | 30 | 25 |
| 27 | 20 | 10 | 60 | 5 | 50 | 4 | H$_2$ | 30 | <7 |
| 28 | 20 | 10 | 60 | 5 | 50 | 2 | O$_2$ | 30 | <7 |
| 29 | 20 | 10 | 60 | 5 | 50 | 3 | NH$_3$ | 30 | <7 |
| 30 | 20 | 10 | 60 | 5 | 50 | 2 | CO$_2$ | 30 | <7 |
| 31 | 20 | 10 | 60 | 5 | 50 | 2 | Ar | 30 | <7 |
| 32 | 20 | 10 | 60 | 5 | 50 | 2 | Ne | 30 | <7 |

Table 1 compiles the data of Samples Nos. 1–32 on the number of carbon atoms in the graft polymer and the ratio of graft polymers to the whole lubricant layer 5 for magnetic recording mediums 20 manufactured by forming a lubricant layer with use of monomers of different numbers of carbon atoms and fluorine atoms and by changing supply power, material gas, its flow rate, irradiation time, ion ratio and the like, in the above-mentioned manufacturing method.

The number of carbon atoms in the graft polymer stated in Table 1 may have various values by controlling the supply power (applied voltage and current) from the power source 30 and the supplied amount of the material gas to generate the radicals or atomic gas. The flow rate is kept constant, particles collide with each other so as to lose charges to become neutral radicals or atomic gas and remain in the discharge tube. Then, they fly to the high vacuum region ($10^{-4}$–$10^{-6}$ Torr) through the slits provided at an end of the discharge tube and arrive an object such as a magnetic recording medium or a sliding member according to the mean free path to form graft polymers. Thus, the charged particles nearly reach the magnetic recording medium or the sliding member directly, and the damages to the protection film are vary small and the lubricant layer itself bonds strongly the protection film. Then, the corrosion resistance of the magnetic recording medium is improved and the abrasive resistance and the low friction characteristic of the sliding member is improved.

The number of carbon atoms in the graft polymer stated in Tables 1–5 in correspondence to Embodiments 1–5 is obtained from the absorption wavelength measured with the infrared spectroscopy. The ratio of graft polymers to the whole lubricant layer 5 is calculated by dividing the amount of lubricant, remained on the protection film 4 after washed with isopropyl alcohol or the like which dissolves the lubricant most, to the amount of lubricant before the washing. The amount of the lubricant is determined by the count of fluorine atoms with the X-ray photoelectron spectroscopy. Further, the ratio of ions is calculated according to a ratio of the peak value of the absorption wavelength with the plasma spectroscopic analysis.

EMBODIMENT 2

Figure 3:
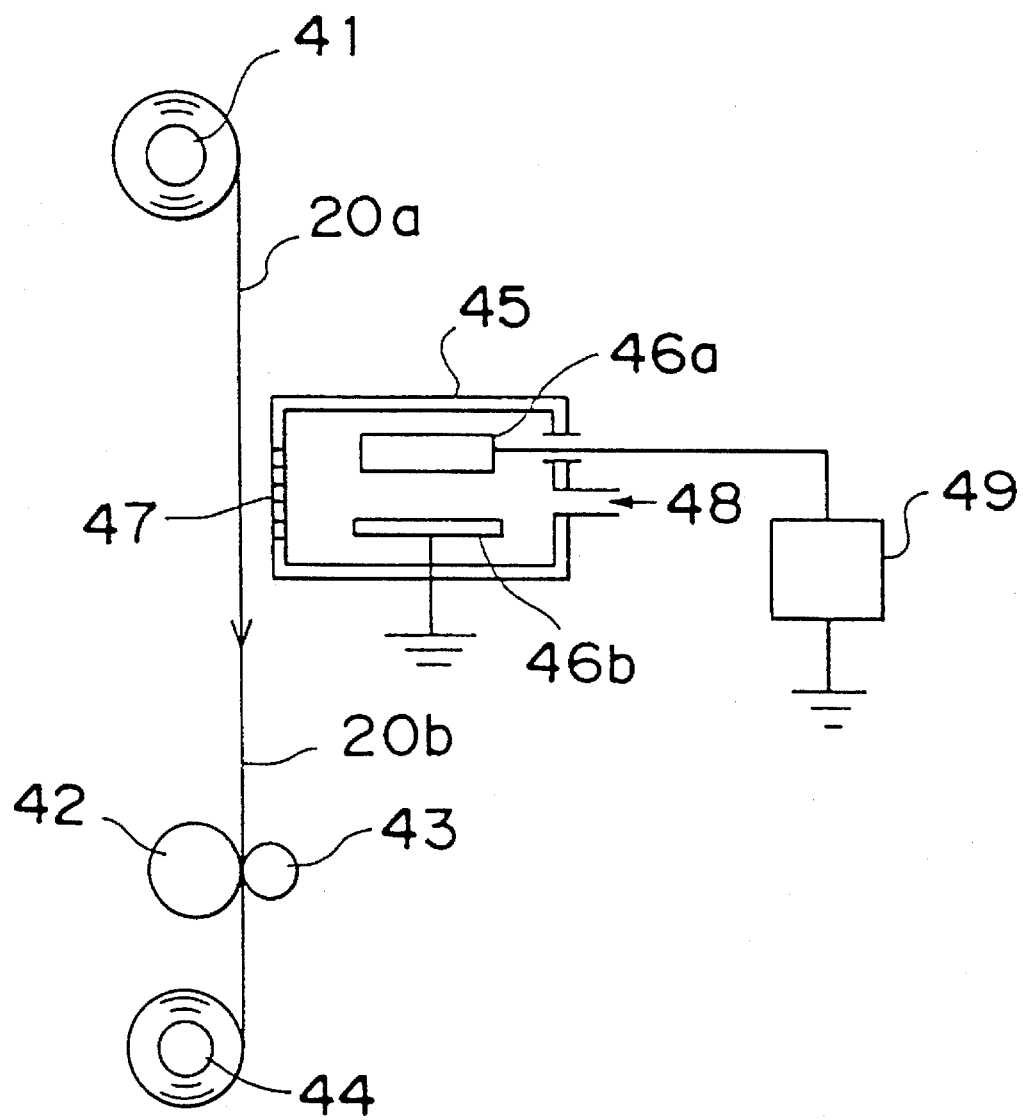
FIG. 3 is a schematic diagram of an apparatus for a manufacturing method wherein graft polymers are formed by using radicals or atomic gas in corona discharge.

FIG. 3 shows a structure of an apparatus wherein radicals or atomic gas generated in corona discharge are used in order to prepare graft polymers which have the protection film 4 as trunks from a part of the monomers of the lubricant layer 5.

This invention is different mainly from Embodiment 1 in a point that graft polymers are formed in air. In FIG. 3, the reference numeral 20a denotes a magnetic recording medium which forms a lubricant layer 5 made of monomers, and as in Embodiment 1, the magnetic recording medium 20a wound on a feed roller 41 is fed by a main roller 42 and a press roller 43 at a constant speed and the magnetic recording medium 20b after the plasma processing is wound by a winding roller 44. The reference numeral 45 denotes a discharge room, and the reference numeral 46a denotes a discharge electrode. Corona discharge is generated between the corona electrode 46b and an earth electrode 47 under the supply of material gas from the gas purge inlet 48 and an electric voltage by a corona power supply 49.

The reference numeral 47 denotes a slit-like outlet for taking out radicals or atomic gas in the corona discharge generated in the discharge room 45. The corona power supply 49 can generate an electric voltage up to 30 kV at a frequency of 1–100 kHz. An device for taking out radicals and atomic gas in the corona discharge is composed of the discharge room 45, the discharge electrode 46a, the earth electrode 46b, the blow-out outlets 47, the gas purge inlet 48 and the corona power supply 49.

A manufacturing method of magnetic recording medium with use of the apparatus as constructed above will be explained below with reference to FIG. 3.

The magnetic recording medium 20a having a lubricant layer 5 made of monomers is fed continuously by the main roller 42 and the press roller 43 from the feed roller 41 to the winding roller 44. On the other hand, the device for generating radicals and atomic gas generates corona plasma in the discharge room 45 under the supply of an electric voltage from the corona power supply 49 and the material gas from the gas purge inlet 48. The ions, radicals and atomic gas generated in the corona plasma irradiate the magnetic recording medium 20 in a state that the ions are cut off by the blow-out outlets 47. Under the action of the radicals or atomic gas, a part of the protection film 4 is combined with a part of the constituent elements of the monomers of the lubricant layer 5 to form graft polymers having the protection film as trunks. Therefore, a strong bond between the protection film 4 and the lubricant layer 5 can be formed. In this case, the lubricant layer 5 is irradiated in a state that the monomers themselves are very stable in air. Therefore, especially, the head clogging is prevented.

Table 2 compiles the data of Samples Nos. 33–47 on the number of carbon atoms in the graft polymer and the ratio of graft polymers to the whole lubricant layer 5 for a magnetic recording medium 20 manufactured by forming a lubricant layer with use of monomers of different numbers of carbon and fluorine atoms and by changing supply power from the corona power supply 39, material gas, its flow rate, irradiation time, ion ratio and the like, in the above-mentioned manufacturing method.

TABLE 2

| Sample No. | Number of C in monomer | Number of F in monomer | Number of C in graft polymer | Supply power (W/cm$^2$) | Ratio of graft polymers (%) | Irradiation time of radicals (sec) | Material gas for radicals | Gas flow rate (cc/min) | Ion ratio (%) |
|---|---|---|---|---|---|---|---|---|---|
| 33 | 10 | 5 | 20 | 5 | 50 | 5 | $N_2$ | 2000 | <7 |
| 34 | 20 | 2 | 60 | 8 | 50 | 4 | $N_2$ | 2000 | <7 |
| 35 | 20 | 5 | 60 | 8 | 50 | 4 | $N_2$ | 2000 | <7 |
| 36 | 20 | 10 | 20 | 6 | 50 | 5 | $N_2$ | 2000 | <7 |
| 37 | 20 | 10 | 60 | 8 | 5 | 0.8 | $N_2$ | 2000 | <7 |
| 38 | 20 | 10 | 60 | 8 | 10 | 1.5 | $N_2$ | 2000 | <7 |
| 39 | 20 | 10 | 60 | 8 | 30 | 3 | $N_2$ | 2000 | <7 |
| 40 | 20 | 10 | 60 | 8 | 50 | 5 | $N_2$ | 2000 | <7 |
| 41 | 20 | 10 | 60 | 8 | 80 | 8 | $N_2$ | 2000 | <7 |
| 42 | 20 | 10 | 60 | 8 | 90 | 10 | $N_2$ | 2000 | <7 |
| 43 | 20 | 20 | 60 | 10 | 50 | 4 | $N_2$ | 2000 | <7 |
| 44 | 20 | 20 | 200 | 20 | 50 | 3 | $N_2$ | 2000 | <7 |
| 45 | 50 | 20 | 200 | 20 | 50 | 3 | $N_2$ | 2000 | <7 |
| 46 | 50 | 50 | 200 | 25 | 50 | 3 | $N_2$ | 2000 | <7 |
| 47 | 100 | 20 | 200 | 28 | 50 | 1.5 | $N_2$ | 2000 | <7 |

The number of carbon atoms in the graft polymer stated in Table 2 may have various values by controlling the supply power (applied voltage times current) from the corona power source 39 and the supplied amount of the material gas to generate the radicals or atomic gas.

The flow rate is kept constant, while the supply power per unit area of the magnetic recording medium 20 is changed for manufacturing each sample. The ratio of graft polymers to the whole lubricant layer 5 can be changed by controlling the time to irradiate radicals or atomic gas to the lubricant layer 5 made of monomers. In concrete, each sample is manufactured by changing the feed speed of the magnetic recording medium 20. The ratio of ions to radicals or atomic gas is 7% or less in this case.

EMBODIMENT 3

Figure 4:
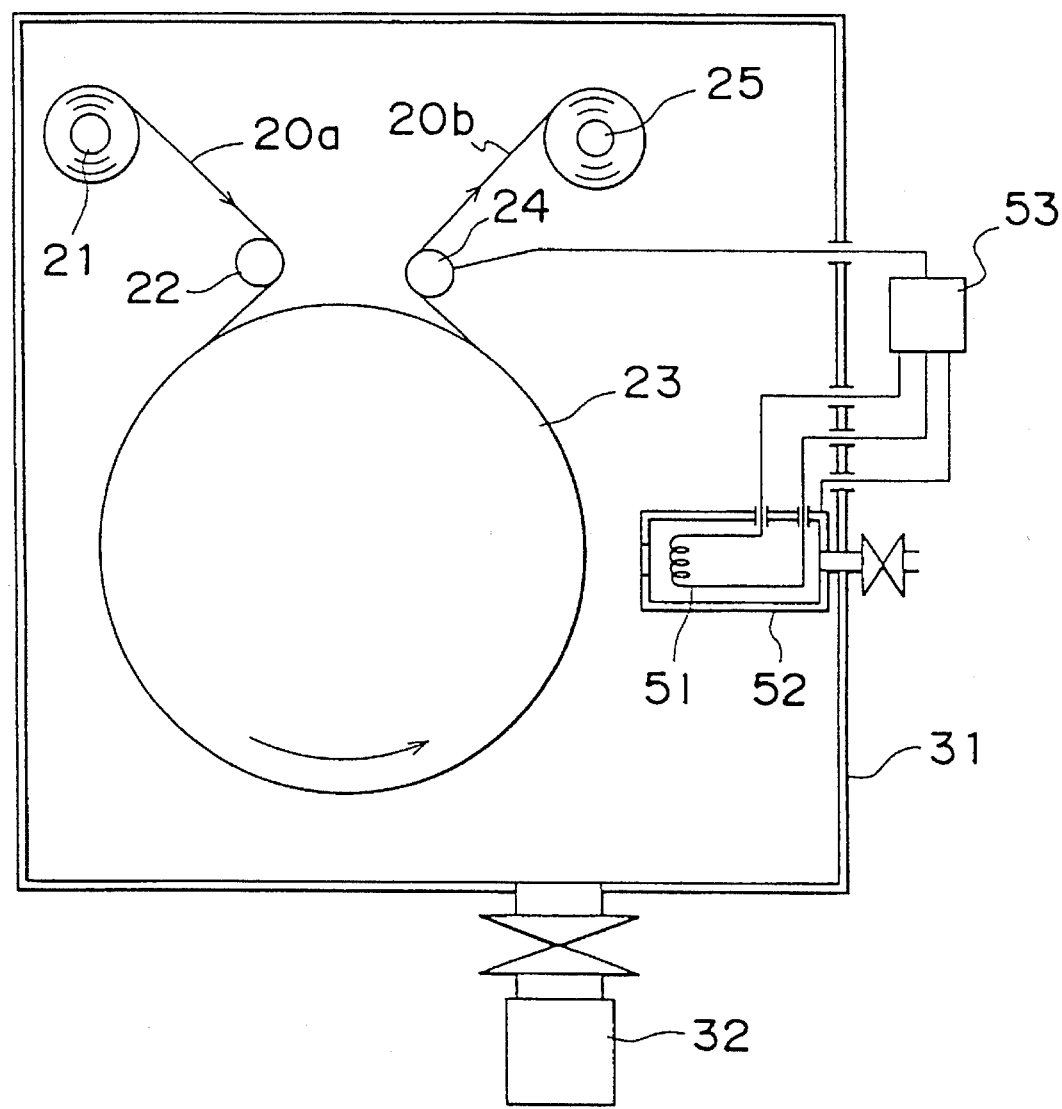
FIG. 4 is a schematic diagram of an apparatus for a manufacturing method wherein graft polymers are formed by using an electron beam.

FIG. 4 shows a structure of an apparatus for manufacturing methods wherein radicals or atomic gas generated with electron beam is used in order to prepare graft polymers which have the protection film 4 as trunks from a part of the monomers of the lubricant layer 5.

This embodiment is different from Embodiment 1 in a point that the graft polymers are formed with an electron beam. The other points are the same as Embodiment 1, and the same components are denoted by the same reference numerals and detailed explanation thereof is omitted.

In FIG. 4, the reference numerals 20a denotes a magnetic recording medium which forms a lubricant layer 5 made of monomers, and as in Embodiment 1, it is fed continuously from a feed roller 21, makes contact closely to the main roller 23 at a constant speed to be wound by a winding roller 25. The reference numeral 51 denotes a filament for generating electrons. The reference numeral 52 denotes an electron keeper to prevent the scattering of the electrons. The reference numeral 53 denotes a power supply for generating an electron beam. The power supply 53 generates an electron beam and accelerates it toward the magnetic recording medium 20.

An device for generating an electron beam is composed of the filament 51 for generating electrons, the electron beam keeper 52 and the power supply 53 for generating an electron beam. Inert gas such as argon can be introduced in the electron beam keeper 52.

A manufacturing method of magnetic recording medium as constructed above will be explained below with reference to FIG. 4.

After the prescribed vacuum is attained, as in Embodiment 1, the surface temperature of the main controller 23 is controlled to be constant. The magnetic recording medium 20a having a lubricant layer 5 made of monomers is fed continuously from the feed roller 21 to the winding roller 25. On the other hand, the device for generating an electron beam generates and accelerates an electron beam by the power supply 53, and the electron beam reaches the magnetic recording medium 20 to isolate a part of the monomers of the protection film 4 or the lubricant layer 5 so as to form graft polymers which have the protection film 4 as trunks. Because an electron beam is used, the advantage of the strong bond between the protection layer 4 and the lubricant layer 5 is large when monomers including double bonds are used as monomers in the lubricant layer 5. In this case, the damages of the protection film 4 and the lubricant layer 5 are small so that the corrosion resistance of the magnetic recording medium 20 is improved further.

Table 3 compiles the data of Samples Nos. 48–62 on the number of carbon atoms in the graft polymer and the ratio of graft polymers to the whole lubricant layer 5 for a magnetic recording medium 20 manufactured by forming a lubricant layer with use of monomers of different numbers of carbon and fluorine atoms by changing supply power from the power supply 42, the acceleration voltage to be applied to the magnetic recording medium 20 via the pass roller 24, irradiation time and the like, in the above-mentioned manufacturing method.

TABLE 3

| Sample No. | Number of C in monomer | Number of F in monomer | Number of C in graft polymer | Power for generating electron beam (W/cm$^2$) | Acceleration voltage (V) | Ratio of graft polymers (%) | Irradiation time of electron beam (sec) |
| --- | --- | --- | --- | --- | --- | --- | --- |
| 48 | 20 | 10 | 60 | 3 | 200 | 50 | 3 |
| 49 | *20 | 10 | 60 | 3 | 100 | 50 | 2.5 |
| 50 | 20 | *10 | 60 | 3 | 150 | 50 | 3 |
| 51 | *20 | *10 | 200 | 3 | 180 | 50 | 2 |
| 52 | 50 | 20 | 200 | 5 | 300 | 50 | 8 |
| 53 | *50 | 20 | 200 | 5 | 250 | 50 | 5 |
| 54 | 50 | *20 | 200 | 5 | 280 | 50 | 7 |
| 55 | *50 | *20 | 200 | 5 | 200 | 5 | 1 |
| 56 | *50 | *20 | 200 | 5 | 200 | 10 | 2 |
| 57 | *50 | *20 | 200 | 5 | 200 | 30 | 4 |
| 58 | *50 | *20 | 200 | 5 | 200 | 50 | 5 |
| 59 | *50 | *20 | 200 | 5 | 200 | 80 | 8 |
| 60 | *50 | *20 | 200 | 5 | 200 | 90 | 10 |
| 61 | 100 | 20 | 200 | 8 | 400 | 50 | 8 |
| 62 | *10 | *20 | 200 | 8 | 300 | 50 | 4 |

*monomer including a double bond.

The number of carbon atoms in the graft polymer stated in Table 3 may have various values by controlling the supply power (applied voltage times current) from the power source 42 for electron beam and the acceleration voltage applied to the magnetic recording medium 20. In this case, the power for generating an electron beam is changed for samples of different numbers of carbon atoms in the monomer, while the acceleration voltage is changed for samples of the same number of carbons in the monomer. Further, the ratio of graft polymers to the whole lubricant layer 5 can be changed by controlling the irradiation time of electron beam to the lubricant layer made of monomers. In concrete, each sample is manufactured by changing the feed speed of the magnetic recording medium 20.

In the method of radiating an electron beam, though electrons are charged particles, the electrons have a light weight of less than $10^{-4}$ of an nitrogen atomic gas. Thus, the generated graft polymers make the action of charged particles and the low damages compatible.

EMBODIMENT 4

Figure 5:
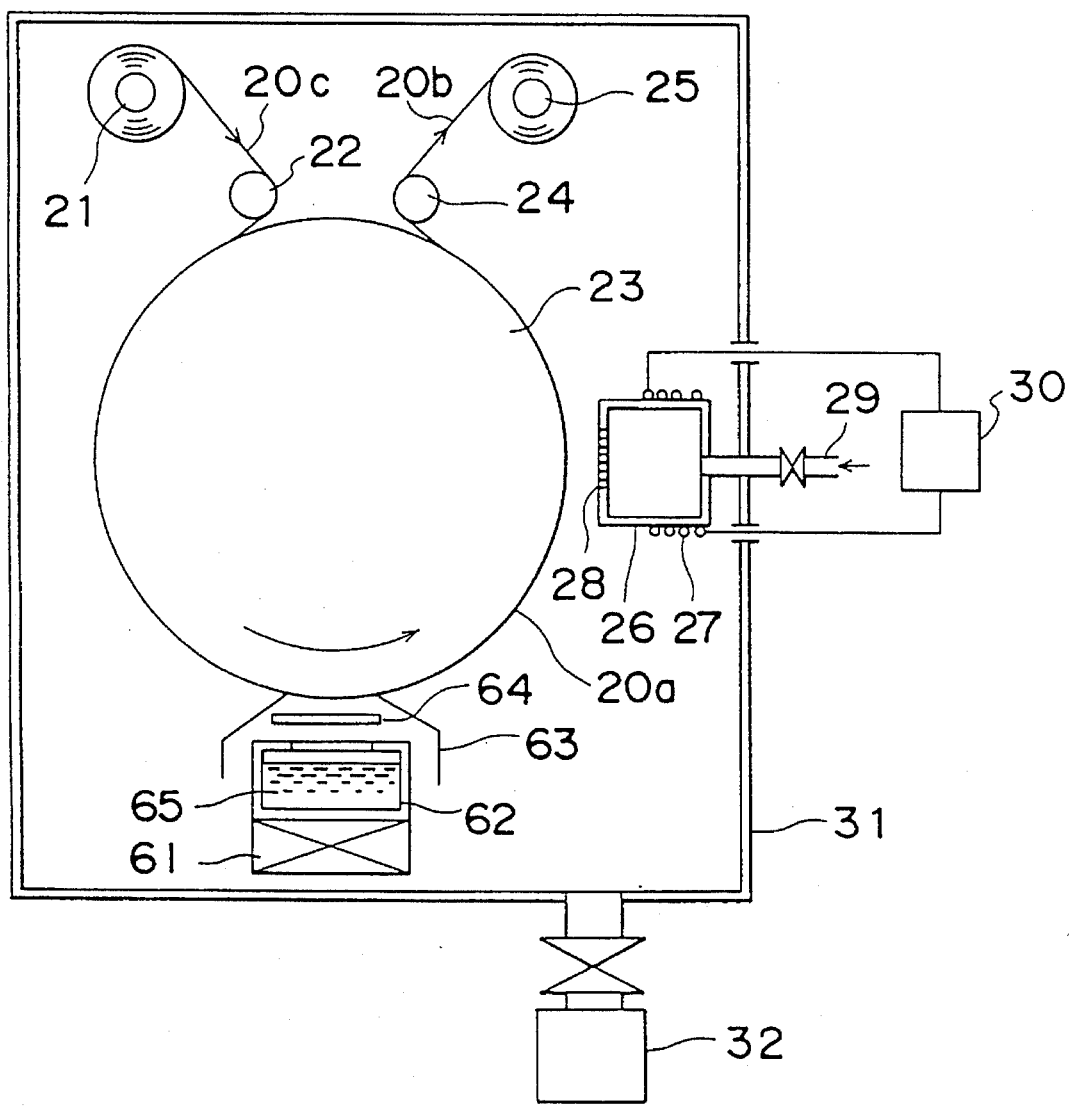
FIG. 5 is a schematic diagram of an apparatus for a manufacturing method wherein the formation of the lubricant layer consisting of monomers and the formation of graft copolymers are processed in the same chamber successively by using radicals or atomic gas generated in a plasma.

FIG. 5 shows a structure of an apparatus for manufacturing methods wherein the formation of a lubricant layer 5 made of monomers and the formation of graft polymers having the protection film 4 as trunks are processed successively with use of radicals or atomic gas.

This embodiment is different from Embodiment 1 in a point that a device for forming a lubricant layer 5 made of monomers is provided in the same vacuum chamber. The other points are the same as Embodiment 1, and the same components are denoted by the same reference numerals and detailed explanation thereof is omitted.

In FIG. 5, the reference numeral 20c denotes a magnetic recording medium on which a lubricant layer 5 made of monomers is not formed, and as in Embodiment 1, it is wound on a feed roller 21 and it makes close contact with and is fed by a main roller 23. The reference numeral 46 denotes a heater of lubricant, the reference numeral 62 denotes an evaporation source, the reference numeral 63 denotes a plate for preventing deposition, the reference numeral 64 denotes a shutter and the reference numeral 65 denotes a lubricant. These compose a device for forming a lubricant layer 5 made of monomers filled in the evaporation source 62.

A manufacturing method of magnetic recording medium with use of the apparatus as constructed above will be explained below with reference to FIG. 5.

After the prescribed vacuum is attained, as in Embodiment 1, the surface temperature of the main controller 23 is controlled to be constant, while the magnetic recording medium 20c on which a lubricant layer 5 made of monomers is not formed is fed continuously to a region for forming a lubricant layer. In the region, the lubricant 47 made of monomers filled in the evaporation source 62 is heated by the heater 43. The shutter 46 is opened when the prescribed evaporation speed is attained, and a lubricant layer 5 is formed on the protection film 4 on the magnetic recording medium 20c. The plate 63 is provided to prevent the contamination of the components of the apparatus with evaporated lubricant particles. The magnetic recording medium 20a on which the lubricant layer 5 is formed is further fed to a region for forming graft polymers, and graft polymers having the protection film 4 as trunks are formed as in Embodiment 1. In this case, the magnetic recording medium 20 is not exposed to air after the lubricant layer 5 is formed. Therefore, the lubricant layer 5 does not absorb moisture at all, and the head clogging can be reduced further.

Table 4 compiles the data of Samples Nos. 63–69 on the number of carbon atoms in the graft polymer and the ratio of graft polymers to the whole lubricant layer 5 for a magnetic recording medium 20 manufactured by forming a lubricant layer with use of the same numbers of carbon atoms and of fluorine atoms which result the good results in Embodiment 1 when irradiation time, under the same supply power, material gas, its flow rate and ion ratio are changed.

TABLE 4

| Sample No. | Number of C in monomer | Number of F in monomer | Number of C in graft polymer | Supply power (W/cm$^2$) | Ratio of graft polymers (%) | Irradiation time of radicals (sec) | Material gas for radicals | Gas flow rate (cc/min) | Ion ratio (%) |
|---|---|---|---|---|---|---|---|---|---|
| 63 | 20 | 10 | 60 | 5 | 5 | 0.5 | N$_2$ | 30 | <7 |
| 64 | 20 | 10 | 60 | 5 | 10 | 1 | N$_2$ | 30 | <7 |
| 65 | 20 | 10 | 60 | 5 | 30 | 2.5 | N$_2$ | 30 | <7 |
| 66 | 20 | 10 | 60 | 5 | 50 | 3 | N$_2$ | 30 | <7 |
| 67 | 20 | 10 | 60 | 5 | 80 | 5 | N$_2$ | 30 | <7 |
| 68 | 20 | 10 | 60 | 5 | 90 | 8 | N$_2$ | 30 | <7 |
| 69 | 20 | 10 | 60 | 5 | 95 | 10 | N$_2$ | 30 | <7 |

The number of carbon atoms in the graft polymer stated in Table 4 may have various values by controlling the supply power (applied voltage times current) from the power source 30 and the supplied amount of the material gas to generate the radicals or atomic gas. The ratio of graft polymers to the whole lubricant layer 5 can be changed by controlling the irradiation time to irradiate radicals or atomic gas to the lubricant layer made of monomers. In concrete, samples are manufactured in the same conditions under which the good results can be obtained. The ratio of ions to radicals or atomic gas is 7% or less in this case.

EMBODIMENT 5

Figure 6:
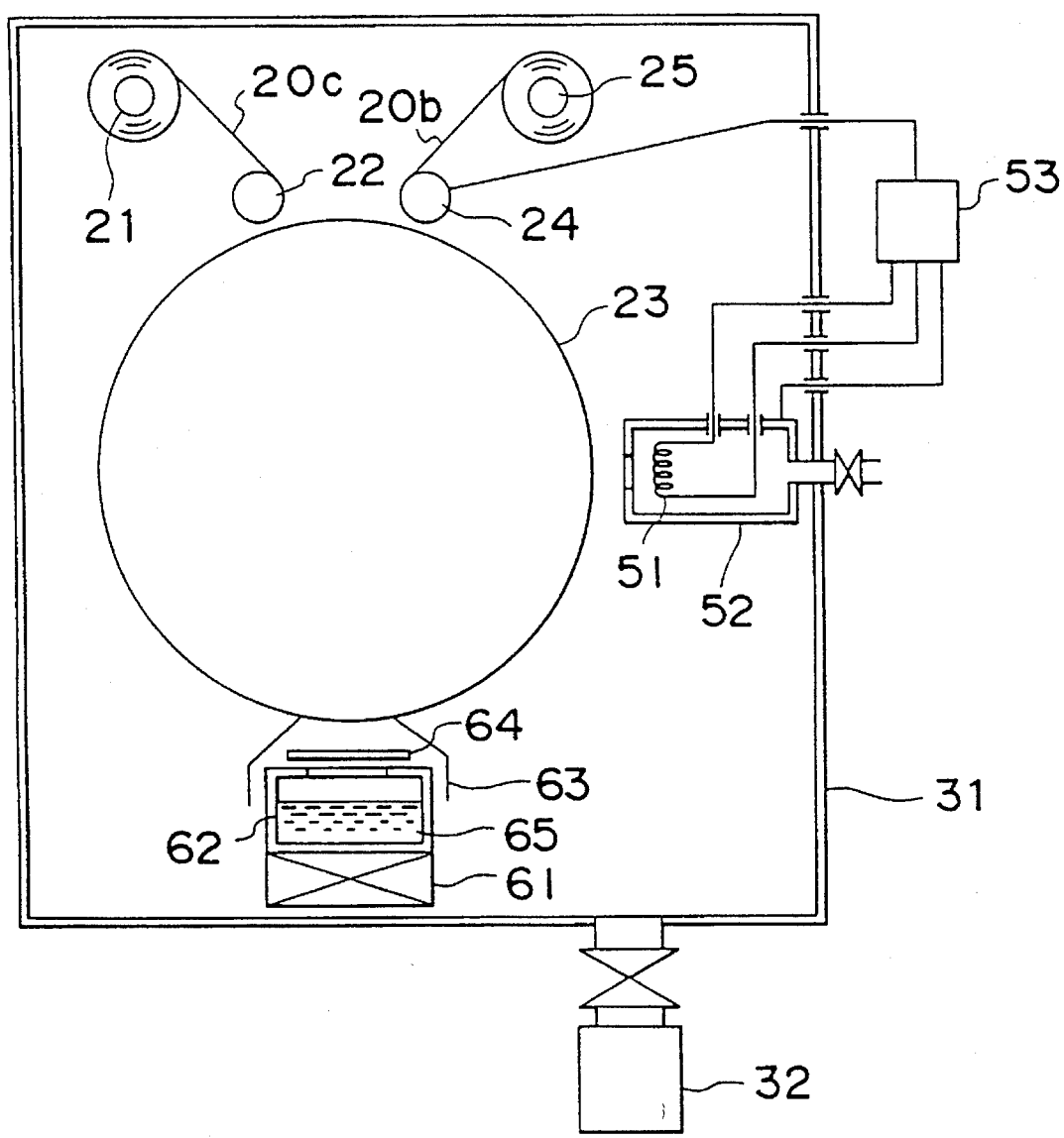
FIG. 6 is a schematic diagram of an apparatus for a manufacturing method wherein the formation of the lubricant layer consisting of monomers and the formation of graft copolymers are processed successively in the same chamber by using an electron beam.

FIG. 6 shows a structure of an apparatus for manufacturing methods wherein the formation of a lubricant layer 5 made of monomers and the formation of graft polymers having the protection film 4 as trunks are processed successively with use of electron beam.

This embodiment combines the device for generating an electron beam in Embodiment 3 and the device for forming a lubricant layer 5 in Embodiment 4. The same components in FIGS. 4 and 5 are denoted by the same reference numerals in FIG. 6, and detailed explanation thereof is omitted. In this case, the lubricant layer 5 does not absorb moisture at all, and the head clogging can be reduced further.

TABLE 5

| Sample No. | Number of C in monomer | Number of F in monomer | Number of C in graft polymer | Power for generating electron beam (W/cm²) | Acceleration voltage (V) | Ratio of graft polymers (%) | Irradiation time of electron beam (sec) | Hardness of protection film (Hv) |
|---|---|---|---|---|---|---|---|---|
| 70 | *50 | *20 | 100 | 4 | 150 | 50 | 6 | 2300 |
| 71 | *50 | *20 | 200 | 5 | 200 | 5 | 1 | 2300 |
| 72 | *50 | *20 | 200 | 5 | 200 | 10 | 2 | 2300 |
| 73 | *50 | *20 | 200 | 5 | 200 | 30 | 4 | 2300 |
| 74 | *50 | *20 | 200 | 5 | 200 | 50 | 5 | 2300 |
| 75 | *50 | *20 | 200 | 5 | 200 | 80 | 8 | 2300 |
| 76 | *50 | *20 | 200 | 5 | 200 | 90 | 10 | 2300 |
| 77 | *50 | *20 | 200 | 5 | 200 | 95 | 12 | 2300 |
| 78 | *100 | *20 | 200 | 8 | 200 | 50 | 4 | 2300 |
| 79 | *50 | *20 | 200 | 5 | 200 | 50 | 5 | 700 |
| 80 | *50 | *20 | 200 | 5 | 200 | 50 | 5 | 900 |
| 81 | *50 | *20 | 200 | 5 | 200 | 50 | 5 | 1000 |
| 82 | *50 | *20 | 200 | 5 | 200 | 50 | 5 | 1500 |
| 83 | *50 | *20 | 200 | 5 | 200 | 50 | 5 | 3000 |

*monomer including a double bond.

Samples of protection films 4 of different Vickers hardness are also manufactured by using the method of this Embodiment.

Table 5 compiles the data of Samples Nos. 70–83 on the number of carbon atoms in the graft polymer and the ratio of graft polymers to the whole lubricant layer 5 for a magnetic recording medium 20 manufactured by forming a lubricant layer with use of monomers of the same numbers of carbon atoms and fluorine atoms which show good results in Embodiment 3 under the same supply power from the power supply 42 and by varying the acceleration voltage to be applied to the magnetic recording medium 20 via the pass roller 24, irradiation time and the like, in the manufacturing method of the embodiment 3.

Samples of the same ratio of graft polymers and of different Vickers hardness are also stated.

The number of carbon atoms in the graft polymer stated in Table 5 may have various values by controlling the supply power (applied voltage times current) from the power source 42 and the acceleration voltage applied to the magnetic recording medium 20. In this case, the power for generating an electron beam is changed for samples of different numbers of carbon atoms in the monomer, while the acceleration voltage is changed for samples of the same number of carbon in the monomers. Further, the ratio of graft polymers to the whole lubricant layer 5 can be changed by controlling the irradiation time of electron beam to the lubricant layer made of monomers. In concrete, the samples are manufactured in the same conditions under which good results are obtained in Embodiment 3.

In samples Nos. 79–83 in Embodiment 5, the hardness of the diamond-like carbon film is changed.

Table 6 shows the data of Comparison examples Nos. 1–6. In Comparison examples Nos. 1–5, a lubricant layer 5 made of monomers on the protection film 4 is formed. In Comparison example No. 6, a lubricant layer 5 made of the lubricant used in Comparison example No. 3 is applied to a protection film 4 which have been forced to be oxidized. In Comparison example Nos. 7–10, a lubricant layer 5 made of the lubricant used in Comparison example No. 3 is applied to a protection film 4 and subjects the lubricant layer 5 to plasma processing. In Comparison examples 7 and 8, samples are prepared by setting the pressure of inert gas at 0.1 Torr and the plasma processing powers at 50 and 25 mW/cm², while in Comparison examples 9 and 10, samples are prepared by setting the pressure of inert gas at 0.05 Torr and the plasma processing powers at 50 and 25 at mW/cm². The ferromagnetic metal thin film 2 and the protection film 4 in these Comparison examples are the same as in Embodiments 1–5. Comparison examples Nos. 8–10 applies a lubricant layer 5 made of monomers to the protection film of low Vickers hardness.

TABLE 6

| Comparison example No. | Hardness of protection film (Hv) | Manufacturing method | Number of C in monomer | Number of F included in monomer | Note |
|---|---|---|---|---|---|
| 1 | 2300 | form a lubricant layer of monomers after a protection film is formed | 10 | 5 | |
| 2 | 2300 | form a lubricant layer of monomers after a protection film is formed | 20 | 5 | |
| 3 | 2300 | form a lubricant layer of monomers after a protection film is formed | 20 | 10 | |
| 4 | 2300 | form a lubricant layer of monomers after a protection film is formed | 50 | 20 | |
| 5 | 2300 | form a lubricant layer of monomers after a protection film is formed | 100 | 10 | |
| 6 | 2300 | form a lubricant layer of monomers after a protection film is forced to be oxidized | 20 | 10 | same lubricant as Comparison Example 3 |
| 7 | 2300 | plasma procesing with inert gas after a lubricant layer is formed (0.1 Torr, 50 mW/cm$^2$) | 20 | 10 | same lubricant as comparison Example 3 (ion ratio 15%) |
| 8 | 2300 | plasma procesing with inert gas after a lubricant layer is formed (0.1 Torr, 25 mW/cm$^2$) | 20 | 10 | same lubricant as comparison Example 3 (ion ratio 10%) |
| 9 | 2300 | plasma procesing with inert gas after a lubricant layer is formed (0.05 Torr, 50 mW/cm$^2$) | 20 | 10 | same lubricant as comparison Example 3 (ion ratio 25%) |
| 10 | 2300 | plasma procesing with inert gas after a lubricant layer is formed (0.05 Torr, 25 mW/cm$^2$) | 20 | 10 | same lubricant as comparison Example 3 (ion ratio 15%) |

The practical performance of magnetic recording mediums manufactured with the methods of the present invention and of Comparison examples are evaluated with a video cassette recorder. Tables 7–12 show the data of the samples of Embodiments 1–5 and Comparison examples Nos. 1–10 on the head clogging, the still frame life, the still frame life under the low humidity environment and the corrosion resistivity of the magnetic recording mediums.

TABLE 7

| | Embodiment 1 | | | | | | | | | |
|---|---|---|---|---|---|---|---|---|---|---|
| | Head clogging | | Still fram life (triple load: min) | | Corrosion resistance (still frame life at 23° C., 10% (double load: min) after remained at 40° C., 90%) | | | | | |
| Sample No. | (sec/100 hr) Evaluation | (23° C. 10%) | 23° C. 70% | 23° C. 10% | Evaluation | Start | 1st week | 2nd week | 3rd week | 4th week |
| 1 | x | >1000 | 15–20 | 10–15 | x | 20 | 15 | 10 | 5 | <5 |
| 2 | Δ | 10 | 40–50 | 30–45 | x | 90 | 60 | 45 | 30 | 20 |
| 3 | x | 20 | 10–15 | 5–10 | x | 15 | 10 | 8 | <5 | <5 |
| 4 | Δ | 10 | 60–90 | 40–60 | Δ | 90 | 75 | 60 | 45 | 30 |
| 5 | Δ | 10 | 90–120 | 60–90 | Δ | 150 | 90 | 60 | 45 | 30 |
| 6 | ○ | 3 | >180 | 120–150 | Δ | >180 | 120 | 90 | 60 | 45 |
| 7 | Δ | 10 | >180 | >180 | x | >180 | 90 | 60 | 30 | 20 |
| 8 | ○ | 3 | >180 | >180 | ○ | >180 | 120 | 90 | 75 | 60 |
| 9 | ⊙ | 1 | >180 | >180 | ○ | >180 | 150 | 120 | 90 | 75 |

TABLE 7-continued

Embodiment 1

| Sample No. | Head clogging | | Still fram life (triple load: min) | | Corrosion resistance (still frame life at 23° C., 10% (double load: min) after remained at 40° C., 90%) | | | | | |
|---|---|---|---|---|---|---|---|---|---|---|
| | Evaluation | (sec/100 hr) (23° C. 10%) | 23° C. 70% | 23° C. 10% | Evaluation | Start | 1st week | 2nd week | 3rd week | 4th week |
| 10 | o | 3 | >180 | >180 | ⊙ | >180 | >180 | >180 | 180 | 150 |
| 11 | o | 5 | >180 | >180 | ⊙ | >180 | >180 | >180 | 150 | 120 |
| 12 | Δ | 10 | >180 | 120–150 | o | >180 | 150 | 97 | 75 | 60 |
| 13 | x | 50 | >180 | 90–120 | Δ | >180 | 90 | 75 | 60 | 45 |
| 14 | x | 100 | >180 | >180 | ⊙ | >180 | >180 | 150 | 120 | 90 |
| 15 | x | >1000 | >180 | >180 | o | >180 | >180 | 90 | 75 | 60 |
| 16 | o | 5 | >180 | >180 | o | >180 | >180 | 120 | 90 | 75 |
| 17 | Δ | 10 | >180 | >180 | ⊙ | >180 | >180 | 150 | 120 | 90 |
| 18 | x | 50 | >180 | >180 | ⊙ | >180 | >180 | >180 | 150 | 120 |
| 19 | Δ | 8 | >180 | 120–150 | o | >180 | 150 | 120 | 90 | 75 |
| 20 | Δ | 10 | >180 | >180 | o | >180 | >180 | 150 | 100 | 75 |
| 21 | x | 30 | >180 | >180 | ⊙ | >180 | >180 | 150 | 120 | 90 |
| 22 | x | 50 | >180 | >180 | o | >180 | >180 | 120 | 90 | 75 |
| 23 | x | 100 | >180 | 120–150 | o | >180 | 150 | 120 | 90 | 75 |
| 24 | x | 100 | >180 | 909–120 | Δ | >180 | 120 | 90 | 60 | 45 |
| 25 | o | 3 | 120–150 | 90–120 | x | >180 | 90 | 45 | 30 | 15 |
| 26 | o | 5 | 60–120 | 60–90 | x | 150 | 60 | 30 | 10 | <5 |
| 27 | o | 3 | >180 | 120–150 | o | >180 | 120 | 90 | 75 | 60 |
| 28 | o | 5 | 120–150 | 90–120 | Δ | >180 | 90 | 75 | 60 | 45 |
| 29 | o | 3 | >180 | 120–150 | o | >180 | 150 | 120 | 90 | 60 |
| 30 | o | 5 | 120–150 | 90–120 | Δ | >180 | 90 | 60 | 45 | 30 |
| 31 | o | 3 | 150–180 | 120–150 | Δ | >180 | 120 | 75 | 60 | 45 |
| 32 | o | 5 | 120–150 | 90–120 | Δ | >180 | 90 | 60 | 45 | 30 |

⊙ : Superior
o : Good
Δ: Unsatisfactory
x: Bad

TABLE 8

Embodiment 2

| Sample No. | Head clogging | | Still frame life (triple load: min) | | Corrosion resistance (still frame life at 23° C., 10% (double load: min) after remained at 40° C., 90%) | | | | | |
|---|---|---|---|---|---|---|---|---|---|---|
| | Evaluation | (sec/100 hr) (23° C. 10%) | 23° C. 70% | 23° C. 10% | Evaluation | Start | 1st week | 2nd week | 3rd week | 4th week |
| 33 | x | 50 | 20–30 | 15–20 | x | 30 | 20 | 10 | <5 | — |
| 34 | o | 5 | 60–90 | 40–60 | x | 90 | 60 | 45 | 30 | 15 |
| 35 | o | 5 | 90–120 | 60–90 | Δ | 150 | 90 | 60 | 45 | 30 |
| 36 | ⊙ | 2 | >180 | 120–150 | Δ | >180 | 120 | 90 | 60 | 45 |
| 37 | o | 5 | >180 | >180 | x | >180 | 60 | 30 | 15 | 10 |
| 38 | ⊙ | 2 | >180 | >180 | Δ | '180 | 120 | 90 | 45 | 30 |
| 39 | ⊙ | <1 | >180 | >180 | Δ | >180 | 120 | 90 | 60 | 45 |
| 40 | ⊙ | 2 | >180 | >180 | o | >180 | >180 | 150 | 90 | 75 |
| 41 | o | 3 | >180 | >180 | o | >180 | >180 | 120 | 75 | 60 |
| 42 | o | 5 | >180 | 120–150 | Δ | >180 | 120 | 90 | 60 | 45 |
| 43 | o | 3 | >180 | >180 | Δ | >180 | 150 | 100 | 75 | 50 |
| 44 | o | 5 | >180 | >180 | o | >180 | 150 | 120 | 90 | 75 |
| 45 | Δ | 10 | >180 | >180 | o | >180 | >180 | 120 | 90 | 60 |
| 46 | x | 30 | >180 | 120–150 | Δ | >180 | 120 | 90 | 60 | 45 |
| 47 | x | 80 | >180 | 90–120 | x | >180 | 90 | 60 | 45 | 20 |

⊙ : Superior
o : Good
Δ: Unsatisfactory
x: Bad

TABLE 9

(Embodiment 3)

| Sample No. | Head clogging Evaluation | Head clogging (sec/100 hr) (23° C. 10%) | Still frame life (triple load: min) 23° C. 70% | Still frame life (triple load: min) 23° C. 10% | Corrosion resistance (still frame life at 23° C., 10% (double load: min) after remained at 40° C., 90%) Evaluation | Start | 1st week | 2nd week | 3rd week | 4th week |
|---|---|---|---|---|---|---|---|---|---|---|
| 48 | Δ | 10 | >180 | 90–120 | o | >180 | 150 | 120 | 90 | 75 |
| 49 | x | 30 | >180 | 90–120 | o | >180 | 150 | 90 | 75 | 60 |
| 50 | Δ | 10 | 120–150 | 90–120 | o | >180 | 120 | 90 | 75 | 60 |
| 51 | x | 30 | 120–150 | 90–120 | o | >180 | 120 | 90 | 75 | 60 |
| 52 | x | 100 | >180 | >180 | ⊙ | >180 | >180 | >180 | 150 | 120 |
| 53 | Δ | 10 | >180 | >180 | ⊙ | >180 | >180 | >180 | 150 | 120 |
| 54 | x | 30 | >180 | >180 | ⊙ | >180 | >180 | 150 | 120 | 90 |
| 55 | Δ | 10 | >180 | >180 | x | >180 | 120 | 60 | 45 | 25 |
| 56 | o | 3 | >180 | >180 | o | >180 | >180 | 150 | 90 | 75 |
| 57 | ⊙ | 1 | >180 | >180 | ⊙ | >180 | >180 | 180 | 120 | 90 |
| 58 | o | 3 | >180 | >180 | ⊙ | >180 | >180 | >180 | >180 | 150 |
| 59 | o | 5 | >180 | >180 | ⊙ | >180 | >180 | >180 | >180 | 150 |
| 60 | Δ | 10 | >180 | 120–150 | ⊙ | >180 | >180 | 150 | 120 | 90 |
| 61 | x | >1000 | >180 | 90–120 | o | >180 | 150 | 120 | 90 | 60 |
| 62 | Δ | 10 | >180 | 90–120 | ⊙ | >180 | 180 | 150 | 120 | 90 |

⊙ : Superior
o : Good
Δ: Unsatisfactory
x: Bad

TABLE 10

Embodiment 4

| Sample No. | Head clogging Evaluation | Head clogging (sec/100 hr) (23° C. 10%) | Still frame life (triple load: min) 23° C. 70% | Still frame life (triple load: min) 23° C. 10% | Corrosion resistance (still frame life at 23° C., 10% (double load: min) after remained at 40° C., 90%) Evaluation | Start | 1st week | 2nd week | 3rd week | 4th week |
|---|---|---|---|---|---|---|---|---|---|---|
| 63 | o | 5 | >180 | >180 | x | >180 | 90 | 60 | 30 | 20 |
| 64 | ⊙ | 2 | >180 | >180 | o | >180 | 120 | 90 | 75 | 60 |
| 65 | ⊙ | <1 | >180 | >180 | o | >180 | 150 | 120 | 90 | 75 |
| 66 | ⊙ | 2 | >180 | >180 | ⊙ | >180 | >180 | >180 | 180 | 150 |
| 67 | o | 3 | >180 | >180 | ⊙ | >180 | >180 | 150 | 120 | 90 |
| 68 | o | 5 | >180 | 120–150 | o | >180 | 150 | 90 | 75 | 60 |
| 69 | x | 20 | >180 | 90–120 | Δ | >180 | 90 | 75 | 60 | 45 |

⊙ : Superior
o : Good
Δ: Unsatisfactory
x: Bad

TABLE 11

Embodiment 5

| Sample No. | Head clogging Evaluation | Head clogging (sec/100 hr) (23° C. 10%) | Still frame life (triple load: min) 23° C. 70% | Still frame life (triple load: min) 23° C. 10% | Corrosion resistance (still frame life at 23° C., 10% (double load: min) after remained at 40° C., 90%) Evaluation | Start | 1st week | 2nd week | 3rd week | 4th week |
|---|---|---|---|---|---|---|---|---|---|---|
| 70 | o | 5 | >180 | >180 | Δ | >180 | 120 | 90 | 60 | 45 |
| 71 | o | 5 | >180 | >180 | x | >180 | 120 | 60 | 45 | 25 |
| 72 | ⊙ | 2 | >180 | >180 | o | >180 | >180 | 150 | 90 | 75 |
| 73 | ⊙ | <1 | >180 | >180 | ⊙ | >180 | >180 | 180 | 120 | 90 |
| 74 | ⊙ | 2 | >180 | >180 | ⊙ | >180 | >180 | >180 | >180 | 150 |
| 75 | o | 3 | >180 | >180 | ⊙ | >180 | >180 | >180 | >180 | 150 |
| 76 | o | 5 | >180 | 150–180 | ⊙ | >180 | >180 | 150 | 120 | 90 |

TABLE 11-continued

Embodiment 5

| 77 | x | 30 | >180 | 150–180 | o | >180 | >180 | 120 | 90 | 75 |
| 78 | Δ | 10 | >180 | 150–180 | o | >180 | >180 | 120 | 90 | 75 |

| Hardness of protection film (Hv) | Sample No. | Head clogging (sec/100 hr) | | Still frame life (triple load: min) | | | Corrosion resistance (still frame life at 23° C., 10% (double load: min) after remained at 40° C., 90%) | | | | |
| --- | --- | --- | --- | --- | --- | --- | --- | --- | --- | --- | --- |
| | | Evaluation | (23° C. 10%) | 23° C. 70% | 23° C. 10% | Evaluation | Start | 1st week | 2nd week | 3rd week | 4th week |
| 800 | 79 | x | >1000 | 10–15 | 5 | x | 10 | — | — | — | — |
| 900 | 80 | x | 500 | 15–20 | 5–10 | x | 15 | — | — | — | — |
| 1000 | 81 | Δ | 10 | 30–40 | 20–30 | x | 60 | 45 | 30 | 20 | 15 |
| 1500 | 82 | o | 5 | 90–120 | 60–90 | o | >180 | 150 | 90 | 75 | 60 |
| 3000 | 83 | o | 3 | >180 | >180 | Δ | >180 | 120 | 60 | 45 | 30 |

⊚ : Superior
o : Good
Δ: Unsatisfactory
x: Bad

TABLE 12

Comparison Examples

| Comparison embodiment No. | Hardness of protection film Hv | Head clogging (sec/100 hr) | | Still frame life (triple load: min) | | | Corrosion resistance (still frame life at 23° C., 10% (double load: min) after remained at 40° C., 90%) | | | | |
| --- | --- | --- | --- | --- | --- | --- | --- | --- | --- | --- | --- |
| | | Evaluation | (23° C. 10%) | 23° C. 70% | 23° C. 10% | Evaluation | Start | 1st week | 2nd week | 3rd week | 4th week |
| 1 | 2300 | x | 100 | 30–40 | 20–30 | x | 60 | 40 | 30 | 15 | 5 |
| 2 | 2300 | x | 30 | 40–60 | 30–40 | x | 90 | 60 | 40 | 20 | 15 |
| 3 | 2300 | Δ | 10 | 120–150 | 90–120 | x | >180 | 80 | 40 | 30 | 20 |
| 4 | 2300 | x | 100 | 150–180 | 90–120 | Δ | >180 | 90 | 60 | 45 | 30 |
| 5 | 2300 | x | >1000 | 30–40 | 20–30 | x | 60 | 40 | 30 | 20 | 10 |
| 6 | 2300 | Δ | 10 | 90–120 | 40–60 | x | 90 | 45 | 20 | 10 | 5 |
| 7 | 2300 | x | >1000 | 60–90 | 30–40 | x | 60 | 30 | 10 | <5 | <5 |
| 8 | 2300 | x | 1000 | 90–120 | 60–80 | x | 90 | 60 | 30 | 10 | 5 |
| 9 | 2300 | x | 100 | 20–30 | 5–10 | x | 20 | — | — | — | — |
| 10 | 2300 | Δ | 10 | 30–40 | 10–20 | x | 30 | — | — | — | — |

Δ: Unsatisfactory
x: Bad

First, the evaluation of the practical performances are explained.

The head clogging is evaluated in concrete as follows: Image signal is recorded for about 90 minutes in a magnetic recording medium 20 cut to have a width of 8 mm, with a video cassette recorder of rotating cylinder type of diameter of 40 mm having two pairs of heads. The heads protrude by 30 μm, and run at a track pitch of about 20 μm and at a relative speed of 3.8 mm/sec against the magnetic recording medium run at 14 mm/sec. Then, the recording medium is reproduced for about 200 hours in an environment of 20° C. and 70% RH. The measured clogging time of the head is scaled per 100 hours. The clogging time of the head is defined as an accumulating time where the lowering of the reproduction output by 6 dB or more is observed for a certain finite time.

The head clogging is evaluated to be superior if it is 2 sec/100 hr or more, good if it is between 2–5 sec/100 hr, unsatisfactory if it is between 5–10 sec/100 hr and bad if it is less than 10 sec/100 hr.

The still frame life is measured as follows: By using the above-mentioned video cassette recorder, the recording is performed in an environment of 23° C. and 70% RH, and the reproduction is performed under a load which is three times the load in a usual run in an environment of 23° C. and 70% RH and of 23° C. and 10% RH. The still frame life is determined as a point when the output becomes zero due to the damages which extend to the ferromagnetic metal thin film 2 of the magnetic recording medium 20. Further, the corrosion resistance is evaluated by putting a magnetic recording medium 20 recorded by the same video cassette recorder as in the measurement of the still frame life in an environment of 40° C. and 90% RH in the as-recorded state and by measuring the still frame life every weak under a load of two times the load in a usual run in an environment of 23° C. and 10% RH. Tables 7–12 show the values measured every weak.

The corrosion resistance is evaluated to be superior if the still frame life is 180 minutes or more at the start and 90 minutes or more after four weeks, good if it is 180 minutes or more at the start and 60 minutes or more after four weeks, unsatisfactory if it is 120 minutes or more at the start and 30 minutes or more after four weeks, and bad if it is 90 monutes or more at the start and less than 30 minutes after four weeks.

Next, the advantages of the embodiments compiled in Tables 7–11 are explained by relating the preferable limits of conditions. In these Tables, the total performance is evaluated as ⊙ (superior), o (good), Δ (unsatisfactory) or x (bad).

First, if Embodiment 1 (Table 7) is compared with Comparison examples 1–10 (Table 12), it is clear that the head clogging, the still frame life and the corrosion resistance are all improved largely in cases of the same numbers of carbon and fluorine atoms included in the monomers.

As to the number of carbon atoms included in the monomer, it is preferable that the number is 10 to 100, more preferably 20–50.

As to the number of fluorine atoms included in the monomer, even if it is 10% or less or 100% or more of the number of carbon atoms, the head clogging increases, and the advantage due to the irradiation of radicals or atomic gas is very small.

As to the ratio of graft polymers to the whole lubricant layer 5, if it is 10% or less, the effect on the corrosion resistance is nearly observed. Though the corrosion resistance increases with increasing the ratio, the head clogging and the lowering of the still frame life are observed. The upper limit is about 90%.

As to the number of the carbon atoms in the graft polymer, the head clogging increases when the number of the carbon atoms increases when the number of the carbon atoms increases above a few times the number of carbon atoms in the monomer.

As to the material gas of radicals or atomic gas, when a material gas including hydrogen, oxygen, argon or a mixture thereof is used, the advantageous effect is observed. However, the effect on corrosion resistance is small. When nitrogen is used as the material gas, the effects on all items are large.

As to the ratio of ions to radicals or atomic gas, if it exceeds 7%, not only the corrosion resistance but also the still frame life deteriorate. However, if it is 7% or less, no problem is observed.

Embodiment 2 (Table 8) has smaller advantages on the still frame life and the corrosion resistance than Embodiment 1 (Table 7). However, it is observed that Embodiment 1 has a large advantage especially on the head clogging. If the corrosion resistance is taken into consideration, the ratio of graft polymers is preferable 10–80% in Embodiment 2, a little narrower than in Embodiment 1.

In Embodiment 3 (Table 9), it is confirmed that the corrosion resistance is improved more than in Embodiment 1 (Table 7) when the numbers of carbon atoms and of fluorine atoms of the monomer is about two times the counterparts in Embodiments 1 and 2 and the monomers includes double bonds.

In Embodiments 4 and 5 (Tables 10 and 11), it is confirmed that the head clogging is reduced when compared with Embodiments 1 and 2.

In samples No. 79–83 in Embodiment 5, if the Vickers hardness does not exceed 1000 kg/cm$^2$, no advantageous effect is observed, while if it exceeds 100 kg/cm$^2$, it is confirmed that the advantageous effect begins to appear. Therefore, if a protection film 4 having a hardness of a threshold value or larger is provided, a lubricant layer 5 including a mixture of the monomers and graft polymers, the protection film 4 and the lubricant layer 5 are combined strongly with chemical bonds. Then, not only the head clogging is reduced, but also the protection film 4 is protected by the lubricant layer due to the graft polymers. Thus, it is considered that the synergistic effect thereof improves the still frame life and the corrosion resistance largely.

As to the method of forming graft polymers, a technique with use of radicals or atomic gas or of electron beam is considered to be most effective in the requirement that no damages are exerted to the protection film 4.

That is, if a protection film is provided which has a hardness enough to prevent the abrasing in a short time with the sliding contact with the head, and a lubricant layer made of a mixture of monomers including long-chain alkyl groups hard to be adhered to the head and fluorine atoms of an amount appropriate to the alkyl groups and graft polymers effective on corrosion resistance mixed in an appropriate ratio, the balance of the head clogging, the still frame life and the corrosion resistance can be attained in a high dimension, as a practical performance of the magnetic recording medium 20.

The above-mentioned Embodiments use a diamond-like carbon film as the protection film 4. When silicon dioxide, alumina or silicon nitride is used as the protection film, a similar advantage on the corrosion resistance is realized. However, the head clogging is nearly improved. Therefore, when the diamond-like carbon film is used as the protection film is used, the balance of the above-mentioned properties becomes the best.

In Embodiments 1, 3, 4 and 5, devices for irradiation radicals or atomic gas or an electron beam is arranged in a position in correspondence to the roller. However, even when the roller is not used, similar advantages are observed. If the roller is used, the overheating can be prevented by the close contact with the roller and the generation of cracks in the ferromagnetic metal thin film 2 itself can be prevented.

As explained above, according to the present invention, a lubricant layer consisting of a mixture of monomers including long-chain alkyl groups is formed on a protection film, and the lubricant layer is irradiated by radicals or atomic gas or by electron beam. Then, the lubricant layer includes a mixture of the monomers and graft polymers having the protection film as trucks. Therefore, the protection film and the lubricant layer bonds chemically. Then, the head clogging can be decreased largely and the still frame life and the corrosion resistance are improved further, for practical performances in a video cassette recorder.

EMBODIMENT 6

In the following embodiments, sliding members according to the present invention are explained.

Figure 7:
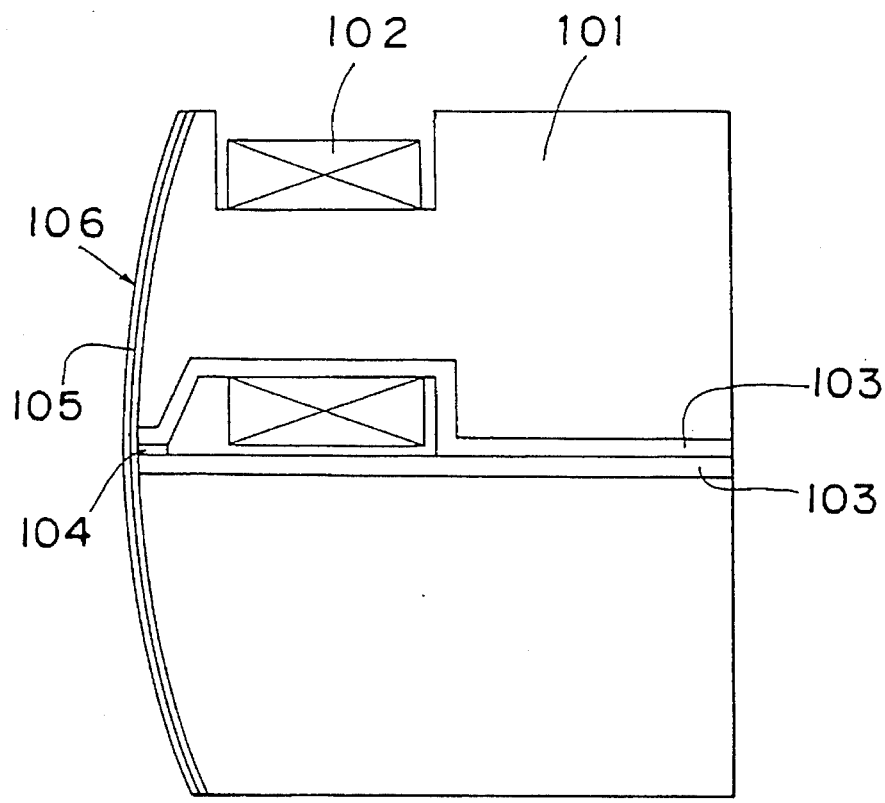
FIG. 7 is a schematic sectional view of a magnetic head of MIG type.

FIG. 7 shows a basic structure of a metal-in-gap head (hereinafter referred to as MIG head) as an example of a sliding member. The reference number 101 denotes a core made from a single ferrite or the like. The reference number 102 denotes a coil which is wound in a prescribed turns on the core 101 of the prescribed structure. The reference numeral 103 denotes a magnetic body of high flux density (hereinafter referred to as high $B_s$ magnetic body). The high $B_s$ magnetic body is made with use of a sputtering technique or the like from a material mixed with elements including Co or Fe as a main component. The reference numeral 104 denotes a gap made from an insulator such as silicon oxide. The reference numeral 105 denotes a protection film of a diamond-like film. The diamond-like film which is a representative of an amorphous carbon film is prepared by using a plasma CVD technique, an ion deposition technique or the like with use of argon and hydrocarbon as material gases. The protection film 105 is formed after the sliding plane of the core 101 with a recording medium is made in a prescribed form. The reference numeral 106 designates a lubricant layer made from a mixture of monomers including long chain alkyl groups and graft polymers having the protection film 105 as trunks. The protection film 105 and the lubricant layer 106 correspond with the counterparts 4, 5 in the magnetic recording medium 20.

The magnetic heads used in the measurements have about 100 μm of core width and about 20 μm of track width, and about 30 μm of head extrusion. The thickness of the protection film 105 is about 300 Å and the thickness of the lubricant layer 106 is about 30 Å.

Figure 8:
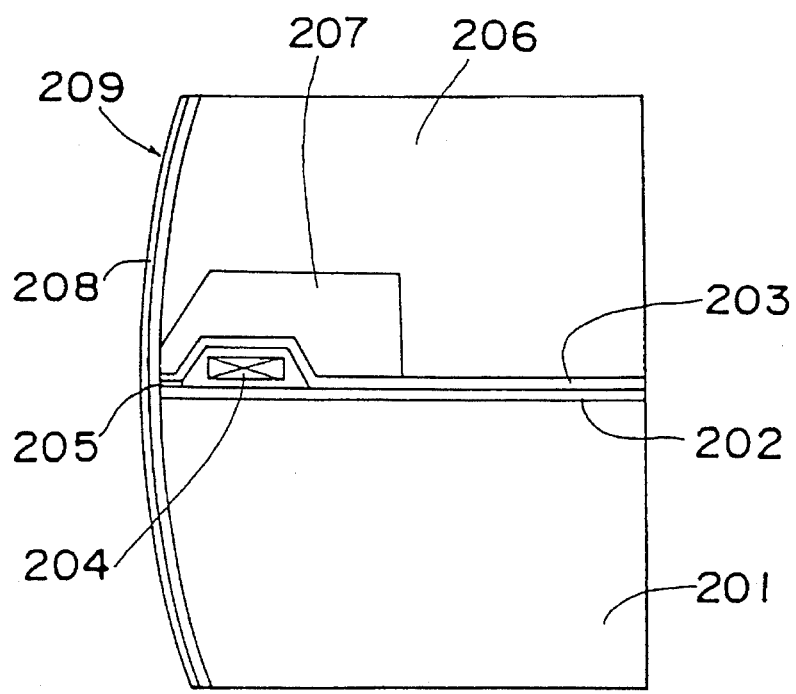
FIG. 8 is a schematic sectional view of a thin film magnetic head.

FIG. 8 shows a basic structure of a magnetic head of thin film type as an example of sliding member. The reference numeral 201 denotes a nonmagnetic substrate made mainly from a ceramic material. The reference numeral 202 denotes a lower magnetic body, while the reference numeral 203 denotes an upper magnetic body. Both magnetic bodies 202 and 203 as well as the nonmagnetic substrate 201 construct a head element. The reference number 204 denotes a coil which is wound in a prescribed turns. The reference numeral 205 denotes a gap made from an insulator such as silicon oxide. The reference numeral 206 denotes a protection substrate, which is adhered with a bonding glass 207 to form a sliding part with a medium. After the sliding part 206 is formed in a prescribed form, a protection film 208 and a lubricant layer 209 are formed, similarly to FIG. 7. The protection film 208 and the lubricant layer 209 correspond with the counterparts in the above-mentioned magnetic recording medium 20.

Table 13 shows the results of the measurement of the output of a MIG head wherein graft polymers having the protection film as trunks are formed by irradiating radicals or atomic gas in the plasma discharge as in Embodiment 1. The MIG head is run for 100 hours with a commercial MP tape of 8 mm in an environment of 10° C. at 80% RH to measure the lowering of the output due to the abrasing of the head.

In samples of Nos. 101–114 of Embodiment 6, the hardness of the protection film 105 is kept constant while the numbers of carbon atoms and fluorine atoms in the monomer are changed. In these cases, the supply power, the irradiation time and the like are changed by using nitrogen gas in order to change the ratio of the graft polymers. On the other hand, in samples of Nos. 115–117, the hardness of the magnetic head is changed while the monomers have the same numbers of carbon atoms and fluorine atoms and the graft polymers have the same ratio. Further, for comparison, Comparison sample 11 has no protection film 105, while Comparison sample 12 has only the protection film 105. Comparison sample 13 has a protection film 105 and a lubricant layer 106 of monomers, and the plasma processing with use of nitrogen is performed.

Next, the magnetic head is evaluated as explained below. Only the magnetic head of the video cassette recorder used in Embodiments 1–5 is exchanged, and a commercial MP tape of 8 mm is used. The output when the record is reproduced for about one minute in the initial state, wherein the highest output can be obtained, is taken as 0 dB. The decrease in output is defined as a ratio of the output to the 0 dB when the record of the same MP tape is reproduced for about one minute after the MP tape is run for 100 hours in an environment of 10° C. at 80% RH. The relative speed of the tape against the head is about 3.8 m/sec.

As shown in Table 13, with reference to Comparison example 11 having no protection film, an advantageous effect begins to appear when the number of carbon atoms of the monomer is about 10 or more and the number of fluorine atoms is about 10% of the number of carbon atoms. It is clear that it is most preferable that the number of carbon atoms of the monomer is about 20, the number of fluorine atoms is about 50 of the number of carbon atoms and the ratio of the graft polymers is about 50%. Further, the results of Comparison examples 12 and 13 are worse even than Comparison example 11 with no protection film.

TABLE 13

| Embodiment Comparison example | Sample No. | Hardness of protection film (kg/mm$^2$) | Number of C in monomer | Number of F in monomer | Ratio of polymers (%) | Decrease in output after 100 H sliding (dB) |
| --- | --- | --- | --- | --- | --- | --- |
| Embodiment 6 | 101 | 2500 | 8 | 4 | 50 | 3.0 |
| | 102 | 2500 | 10 | 5 | 50 | 2.0 |
| | 103 | 2500 | 20 | 1 | 50 | 2.5 |
| | 104 | 2500 | 20 | 2 | 50 | 2.0 |
| | 105 | 2500 | 20 | 5 | 50 | 1.0 |
| | 106 | 2500 | 20 | 10 | 7 | 2.5 |
| | 107 | 2500 | 20 | 10 | 10 | 1.0 |
| | 108 | 2500 | 20 | 10 | 50 | 0 |
| | 109 | 2500 | 20 | 10 | 90 | 1.0[1] |
| | 110 | 2500 | 20 | 10 | 95 | 1.0[2] |
| | 111 | 2500 | 20 | 20 | 50 | 2.0[1] |
| | 112 | 2500 | 20 | 25 | 50 | 2.0[2] |
| | 113 | 2500 | 50 | 20 | 50 | 1.5 |
| | 114 | 2500 | 100 | 20 | 50 | 2.0[1] |
| | 115 | 900 | 20 | 10 | 50 | 3.5[1] |
| | 116 | 1000 | 20 | 10 | 50 | 2.0 |
| | 117 | 4000 | 20 | 10 | 50 | 1.0 |
| comparison example | 11 | — | — | — | — | 3.0 |
| comparison example | 12 | 2500 | — | — | — | 4.5 |
| comparison example | 13 | 2500 | 20 | 10 | — | 4.0[3] |

NB
[1] The head clogging is observed.
[2] The head clogging is observed in many samples.
[3] Plasma processing of 0.1 Torr, and 25 W/cm$^2$.

Further, it is confirmed that it is advantageous that the hardness of the protection film is 1000 kg/mm² or more.

As to magnetic heads of thin film type and of layered type, similar measurements are carried out, and similar results are confirmed.

From the above-mentioned results, it is advantageous for a magnetic head that the number of carbon atoms of the monomer is about 10 or more and the number of fluorine atoms is about 10% to 100% of the number of carbon atoms. If the total performance as a magnetic head, especially the head clogging, is taken into account, it is preferable that the number of carbon atoms of the monomer is about 20 to 100 and the number of fluorine atoms is about 25 to 100% of the number of carbon atoms. The ratio of the graft polymers is preferable to be 10 to 90%. Further, it is preferable that the Vickers hardness of the protection film is 1000 kg/mm² or more.

To sum up, by providing a protection film having a hardness above a certain value and a lubricant layer bonding hard to the protection film, the abrasion resistance and the low friction characteristic are maintained for a long time, and the head keeps the prescribed form. Thus, the deterioration of the output can be prevented.

Especially, for magnetic heads having only a protection layer of high hardness, the friction coefficient increases. On the other hand, for magnetic heads having a lubricant layer formed on a protection layer and processed with plasma, the protection film is damaged due to the plasma processing. Thus, it is considered that the abrasion proceeds partly selectively due to the offset of the contact pressure and the spacing near the gap increases to deteriorate the output. The thickness of the protection film 208 is about 300 Å and the thickness of the lubricant layer 209 is about 30 Å.

EMBODIMENT 7

Figure 9:
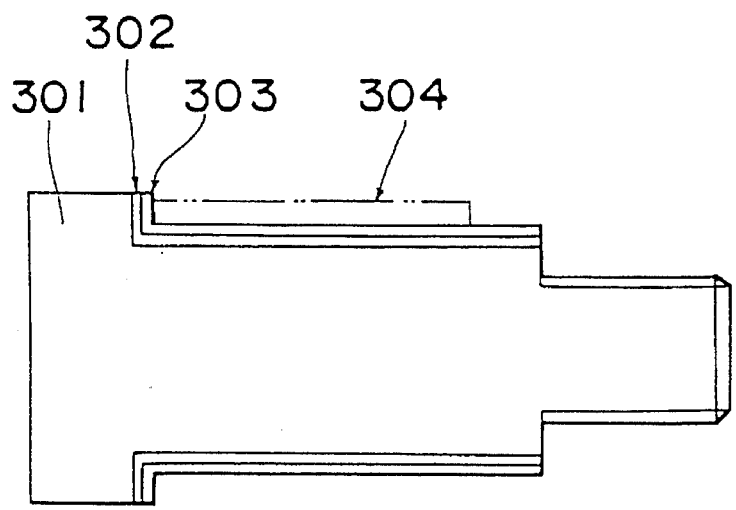
FIG. 9 is a schematic sectional view of a guide for fixing a tape in a video cassette recorder.

FIG. 9 shows a basic structure of a tape fixing guide to guide a tape in a video cassette recorder as an example of a sliding member. In FIG. 9, the reference numeral 301 denotes a metallic substrate made from for example a stainless steel. After the metallic substrate 301 is formed in a prescribed form having a sliding cylindrical plane, a protection film 302 and a lubricant layer 303 are formed on the sliding cylindrical plane. The reference numeral 304 denotes a magnetic recording medium which slides on the lubricant layer 303. Further, the protection film 302 and the lubricant layer 302 and the manufacturing step therefor are the same as Embodiment 6. Therefore, detailed explanation is omitted here. The thickness of the protection film 302 is about 300 Å and the thickness of the lubricant layer 303 is about 30 Å.

EMBODIMENT 8

Figure 10:
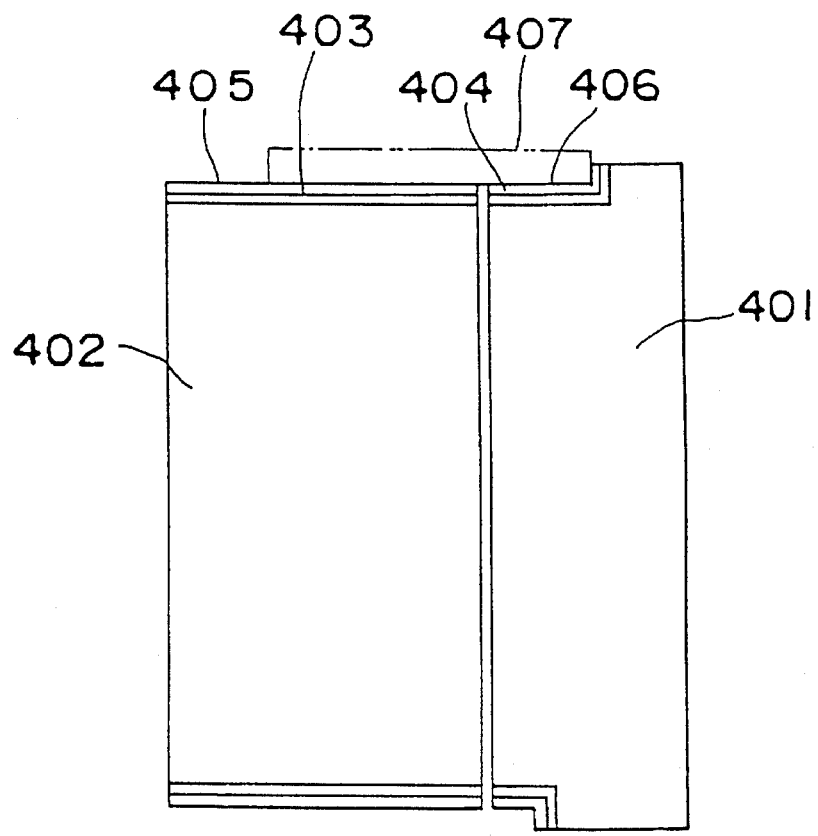
FIG. 10 is a schematic sectional view of a drum for recording and reproduction of video cassette recorder.

FIG. 10 shows a basic structure of a drum for recording and reproduction used in a video cassette recorder as an example of a sliding member. In FIG. 10, the reference numeral 401 denotes a fixed drum base, and the reference numeral 402 denotes a rotating drum base, both made from a hard aluminum alloy or the like. After the drums 401, 402 are formed in prescribed forms, protection films 403, 404 and lubricant layer 405, 406 including graft polymers having the protection film as trunks are formed. The reference numeral 407 denotes a sliding medium (a magnetic tape) which runs on the lubricant layers 405, 406. The protection film 403, 404 and the lubricant layer 405, 406 and the manufacturing steps therefor are similar to Embodiment 6. Therefore, detailed explanation is omitted here. The thicknesses of the protection films 403, 404 are about 300 Å and the thicknesses of the lubricant layers 405, 406 are about 30 Å.

In Table 14, the samples of Embodiments 7 and 8 have the protection film and the lubricant layer in the same way as Embodiment 6 and the data of the samples having the largest increase in friction coefficient are stated. On the other hand, Comparison samples 14, 17 have no protection film, while Comparison samples 15, 18 have only protection films 303, 403, 404. Comparison samples 16, 19 have protection films 303, 403, 404 and lubricant layers 304, 405, 406 of monomers, and the plasma processing with use of nitrogen is performed.

TABLE 14

| Embodiment and Comparison example | Sample No. | Hardness Hv of protection film (kg/mm²) | Number of C in monomer | Number of F in monomer | Ratio of graft polymers | Ratio of friction coefficient to the initial value |
|---|---|---|---|---|---|---|
| Embodiment 7 | 118 | 2500 | 20 | 10 | 50 | 1.05 |
| Comparison example | 14 | — | — | — | — | 3.0 |
| Comparison example | 15 | 2500 | — | — | — | 2.0 |
| Comparison example | 16 | 2500 | 20 | 10 | — | 1.8[1)] |
| Embodiment 8 | 119 | 2500 | 20 | 10 | 50 | 1.1 |
| Comparison example | 17 | — | — | — | — | 2.0 |
| Comparison example | 18 | 2500 | — | — | — | 1.8 |
| Comparison example | 19 | 2500 | 20 | 10 | — | 1.5[1)] |

NB
[1)]plasma processing with 0.1 Torr $N_2$ gas and 25 mW/cm²

The friction coefficient $\mu_k$ is measured as follows: The friction coefficient when the sliding medium 304, 407 is not slided at all is taken as the initial value as a standard. The sliding magnetic recording medium used is a commercial 8 mm MP magnetic tape. The measurement conditions are 10 gf of load weight and about 15 mm/sec of run speed of sliding medium, which are similar to the actual run conditions of video cassette recorder. After the initial value is measured, the tape fixing guide and the drum for recording and reproduction are installed in the video cassette recorder and the commercial 8 mm MP tape is run (or slided) for 1000 hours. Then, the friction coefficient is measured in the same conditions as the initial value, and a ratio of the measured value to the initial value shown in Table 14 is calculated.

The results of Table 14 shows that the ratio of the friction coefficient to the initial value is smaller largely than those of Comparison examples. That is, it is clear that the increase in friction coefficient is small.

The reason for this data is considered to be similar to that of Embodiments 1–6, and the detailed explanation is omitted.

In Embodiments 6–8, samples are made with use of devices for irradiating radicals or atomic gas in the plasma discharge. However, as in the magnetic recording medium of Embodiments 1–5, similar advantages are confirmed for samples with use of irradiating radicals or atomic gas in the corona discharge, irradiating an electron beam and successively forming the lubricant layer of monomers and polymerizing the monomers in the same chamber as in Embodiments 1–5.

Then, the Vickers hardness of said protection film is preferably 1000 kg/mm$_2$ or more. The monomers include preferably fluorine atoms of 10–100% of the number of carbon atoms. The graft polymers include preferably fluorine atoms of 10–100% of the number of carbon atoms of said monomer. The ratio of the graft polymers to the lubricant layer is preferably 10–90%.

On the contrary, as shown in the data of Comparison examples 7–10 subjected to the plasma processing after the lubricant layer is formed as in a prior art, damages such as pin holes are generated in the protection film itself due to the collisions of charged particles such as ions with the magnetic recording medium, and especially in an environment of high temperature and high humidity, the moisture penetrates through the damages to allow stains to appear. Thus, the bonding strength between the ferromagnetic metal thin film and the protection film decreases and the still frame life is shortened.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing a magnetic recording medium comprising the steps of:

forming a ferromagnetic metal thin film on a nonmagnetic substrate;

forming a protection film on said ferromagnetic metal thin film;

forming a lubricant layer on said protection film, said lubricant layer consisting of monomers; and forming graft polymers by irradiating said lubricant layer with radicals or atomic gas, wherein the ratio of irradiation ions to the radicals and atomic gas for irradiating said lubricant layer is 7% or less.

2. A method of manufacturing according to claim 1, wherein radicals or atomic gas generated in a plasma discharge are used as a source of said radicals or atomic gas for irradiating said lubricant layer.

3. A method of manufacturing according to claim 1, wherein radicals or atomic gas generated in corona discharge are used as a source of said radicals or atomic gas for irradiating said lubricant layer.

* * * * *